(12) United States Patent
Li et al.

(10) Patent No.: US 8,810,614 B2
(45) Date of Patent: Aug. 19, 2014

(54) METHOD, DEVICE AND SYSTEM FOR DISPLAYING THREE-DIMENSIONAL STEREO IMAGES

(75) Inventors: Hung-Chun Li, Taoyuan County (TW); Yi-Chiang Lai, Taoyuan County (TW); Bo-Wei Lan, Taipei (TW)

(73) Assignee: Chunghwa Picture Tubes, Ltd., Padeh, Taoyuan (TW)

( * ) Notice: Subject to any disclaimer, the term of this patent is extended or adjusted under 35 U.S.C. 154(b) by 251 days.

(21) Appl. No.: 13/450,166

(22) Filed: Apr. 18, 2012

(65) Prior Publication Data

US 2013/0106926 A1 May 2, 2013

(30) Foreign Application Priority Data

Oct. 28, 2011 (TW) .............................. 100139266 A (51) Int. Cl.
| | |
|---|---|
| G09G 5/10 | (2006.01) |
| H04N 13/04 | (2006.01) |
| G09G 3/00 | (2006.01) |
| G09G 3/34 | (2006.01) |
| G02F 1/1335 | (2006.01) |

(52) U.S. Cl.
CPC .... G09G 3/003 (2013.01); *G02F 2001/133601* (2013.01); *G09G 2310/024* (2013.01); H04N 13/0429 (2013.01); *G09G 2320/0673* (2013.01); *G09G 2300/023* (2013.01); H04N 13/0497 (2013.01); G09G 3/342 (2013.01); H04N 13/0434 (2013.01)
USPC ................. 345/691; 349/15; 359/462; 348/42

(58) Field of Classification Search
CPC .............. H04N 13/04; H04N 13/0429; H04N 13/0431; H04N 13/0436; H04N 13/0434; H04N 13/0438; G09G 3/34; G09G 3/3406; G09G 3/342

USPC ........ 345/4, 5, 6, 102, 691; 349/15; 362/97.1, 362/97.2, 97.3; 348/42–60
See application file for complete search history.

(56) References Cited

U.S. PATENT DOCUMENTS

| | | | | |
|---|---|---|---|---|
| 5,945,965 | A * | 8/1999 | Inoguchi et al. | ................... 345/6 |
| 7,843,529 | B2 | 11/2010 | Ikeno et al. | |
| 8,350,974 | B2* | 1/2013 | Tai et al. | .......................... 349/15 |

(Continued)

FOREIGN PATENT DOCUMENTS

| | | |
|---|---|---|
| CN | 1955793 | 5/2007 |
| CN | 101556410 | 10/2009 |
| CN | 102193204 | 9/2011 |
| TW | 201103003 A1 | 1/2001 |

*Primary Examiner* — Koosha Sharifi-Tafreshi
(74) *Attorney, Agent, or Firm* — Muncy, Geissler, Olds & Lowe, P.C.

(57) ABSTRACT

A 3D displaying device includes a first panel, a second panel and a backlight unit. The first panel includes a first liquid crystal layer for providing a left-eye image and a right-eye image. The second panel includes a first driving electrode substrate, a second driving electrode substrate and a second liquid crystal layer disposed between the first driving electrode substrate and the second driving electrode substrate, whereby light passing therethrough to generate polarization of a first angle or a second angle, wherein the second panel includes at least three sub-panel units. The backlight unit is disposed below the first panel and includes at least three light-emitting areas respectively corresponding to the at least three sub-panel units for providing a light source to the first panel and the second panel.

12 Claims, 9 Drawing Sheets

(56) References Cited

U.S. PATENT DOCUMENTS

| | | | |
|---|---|---|---|
| 2006/0145978 A1* | 7/2006 | Takatori et al. | 345/87 |
| 2007/0126691 A1* | 6/2007 | Lin et al. | 345/102 |
| 2009/0243995 A1* | 10/2009 | Kimura | 345/102 |
| 2010/0007716 A1* | 1/2010 | Lee et al. | 348/43 |
| 2010/0020062 A1* | 1/2010 | Liou et al. | 345/213 |
| 2011/0084961 A1* | 4/2011 | Son et al. | 345/419 |
| 2011/0193897 A1* | 8/2011 | Park et al. | 345/691 |
| 2011/0227886 A1* | 9/2011 | Lee et al. | 345/204 |
| 2011/0228182 A1* | 9/2011 | Lee et al. | 349/15 |
| 2011/0273440 A1* | 11/2011 | Park et al. | 345/419 |

* cited by examiner

METHOD, DEVICE AND SYSTEM FOR DISPLAYING THREE-DIMENSIONAL STEREO IMAGES

CROSS-REFERENCE TO RELATED APPLICATION

This application claims the benefit of Taiwan Patent Application No. 100139266, filed on Oct. 28, 2011, which is hereby incorporated by reference for all purposes as if fully set forth herein.

BACKGROUND OF THE DISCLOSURE

1. Field of Disclosure

The present disclosure relates to a method for displaying three-dimensional stereo images, and more particularly to device and system for displaying three-dimensional stereo images.

2. Related Art

A three-dimensional (3D) vision manner of a 3D displaying system refers to displaying different content in a left-eye and a right eye of a human. Specifically, the 3D vision manner needs to present different images in the left eye and the right eye of the human. In a special 3D vision manner, i.e., 3D displaying method having a time-series function, images are presented to the left eye and the right eye alternately.

In order to ensure complete 3D vision manner, the 3D displaying system generally matches with a pair of alternate shutter glasses. After a user wears the alternate shutter glasses, the left eye of the user may view left images and the right eye of the user may view right images at proper time.

Figure 1:
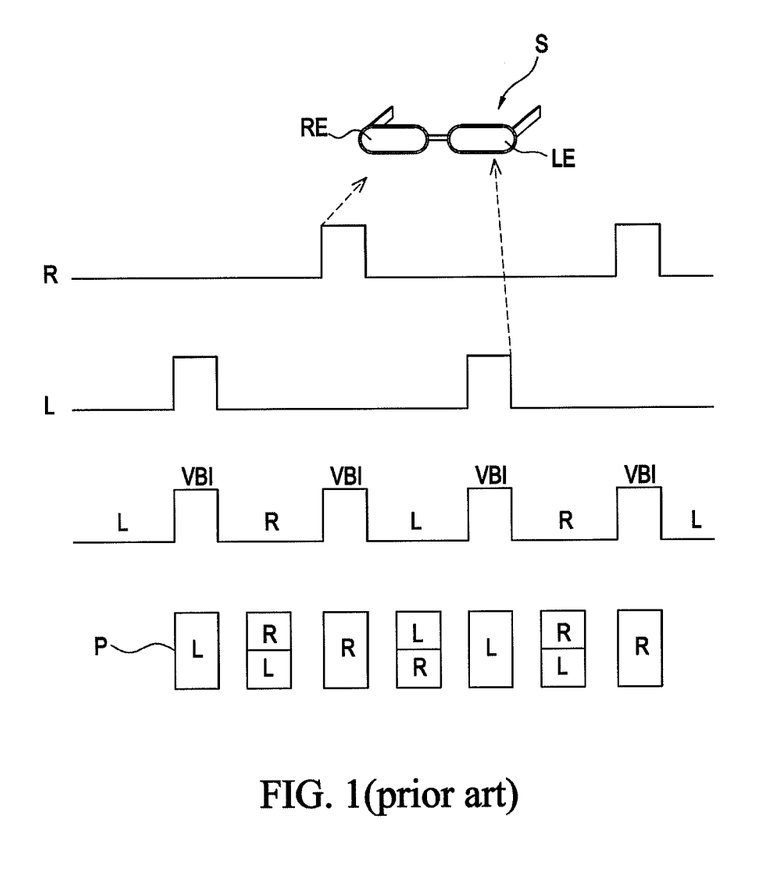
FIG. 1 is a timing diagram of a pair of alternate shutter glasses of a first type of conventional 3D displaying system during using.

Referring to FIG. 1, it shows a timing diagram of a pair of alternate shutter glasses of a first type of conventional 3D displaying system during using. When a displaying device matched with the alternate shutter glasses is a liquid crystal display (LCD), a frame rate thereof must be increased from the convention 60 Hz to 120 Hz, and a vertical blanking interval (VBI) is added. When a right frame data R is written in a liquid crystal (LC) panel, a right-eye spectacle RE of the alternate shutter glasses S is opened in the VBI; and when left frame data L is written in the LC panel, a left-eye spectacle LE of the alternate Shutter glasses S is opened in the VBI. Accordingly, the above-mentioned actions are repeated according to this sequence, so that images are transferred to a human brain through eyes (the left eye and the right eye) of the human to be combined into 3D stereo images. However, the conventional alternate shutter glasses needs to consume electricity, and many electronic parts are placed in the alternate shutter glasses, which increases the weight and volume of the alternate shutter glasses, thereby affecting the comfort of viewers.

Figure 2:
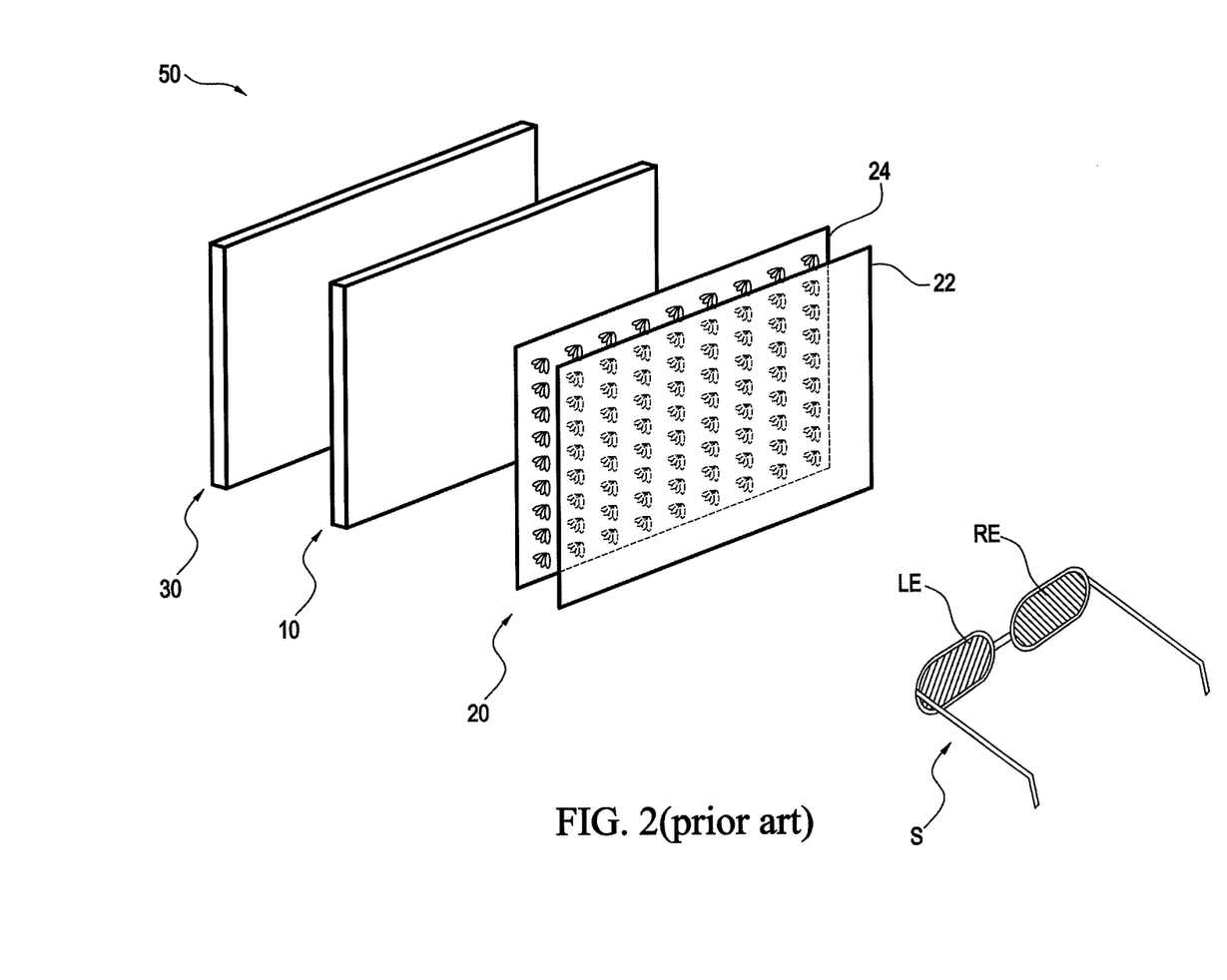
FIG. 2 is a schematic exploded perspective view of a second type of conventional 3D displaying system.

Referring to FIG. 2, the prior art provides a second type of 3D displaying system 50, which includes an LC retarder capable of overcoming the foregoing disadvantages. The 3D displaying system uses a first panel 10 for providing a left-eye image and a right-eye image. A second panel 20 is disposed above the first panel 10, wherein the second panel 20 includes upper and lower driving electrode substrates 22, 24, which each has a single sheet of driving electrode. A backlight unit 30 is disposed below the first panel 10, for providing a light source to the first panel 10 and the second panel 20. The 3D displaying system 50 further includes a pair of polarized glasses, which has a left-eye spectacle LE being a polarizer of 135 degrees, and a right-eye spectacle RE being a polarizer of 45 degrees.

Figure 3A:
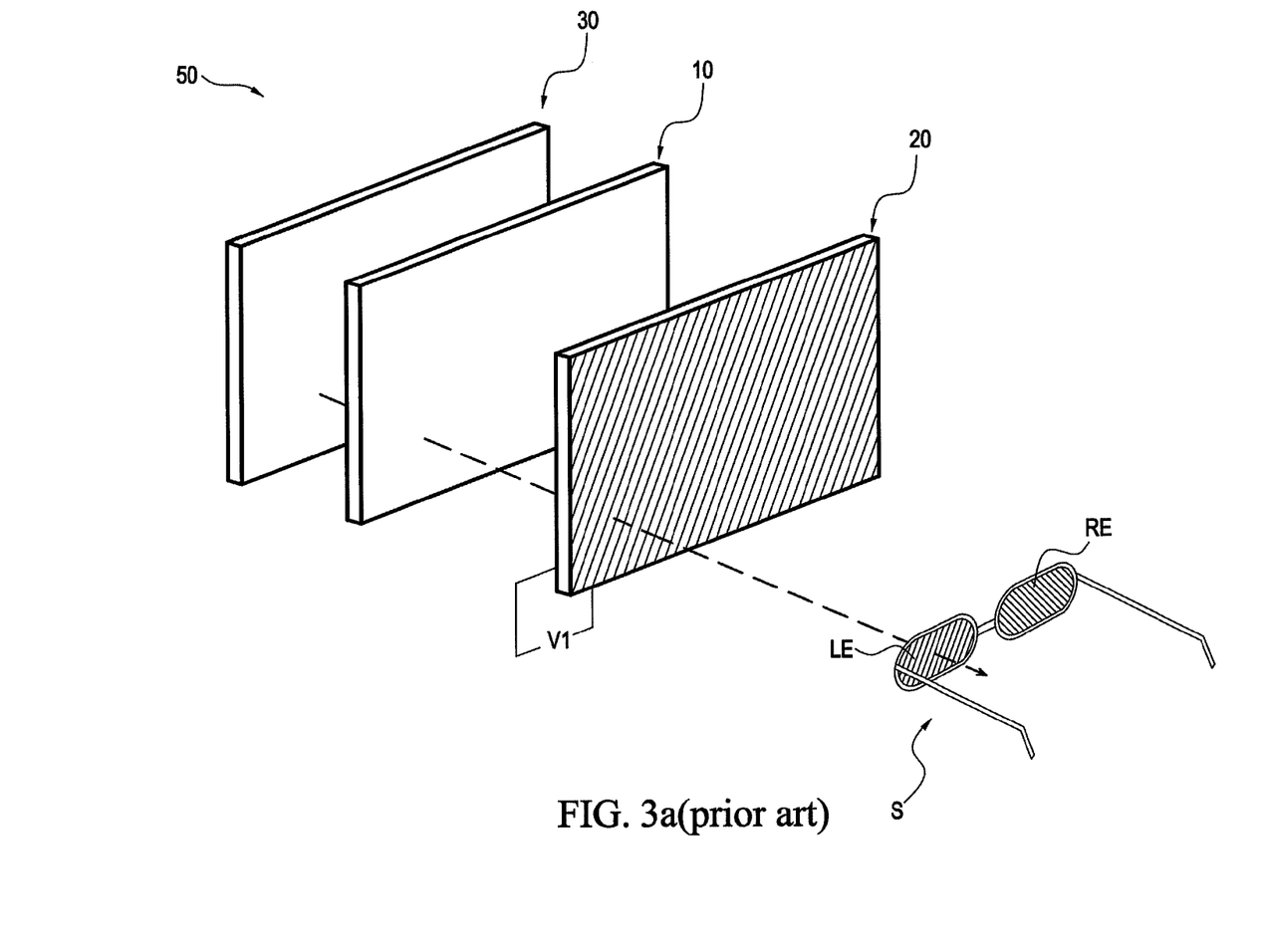
FIG. 3a and FIG. 3b are schematic exploded perspective views of the second type of conventional 3D displaying system, showing operations of the 3D displaying system.
Figure 3B:
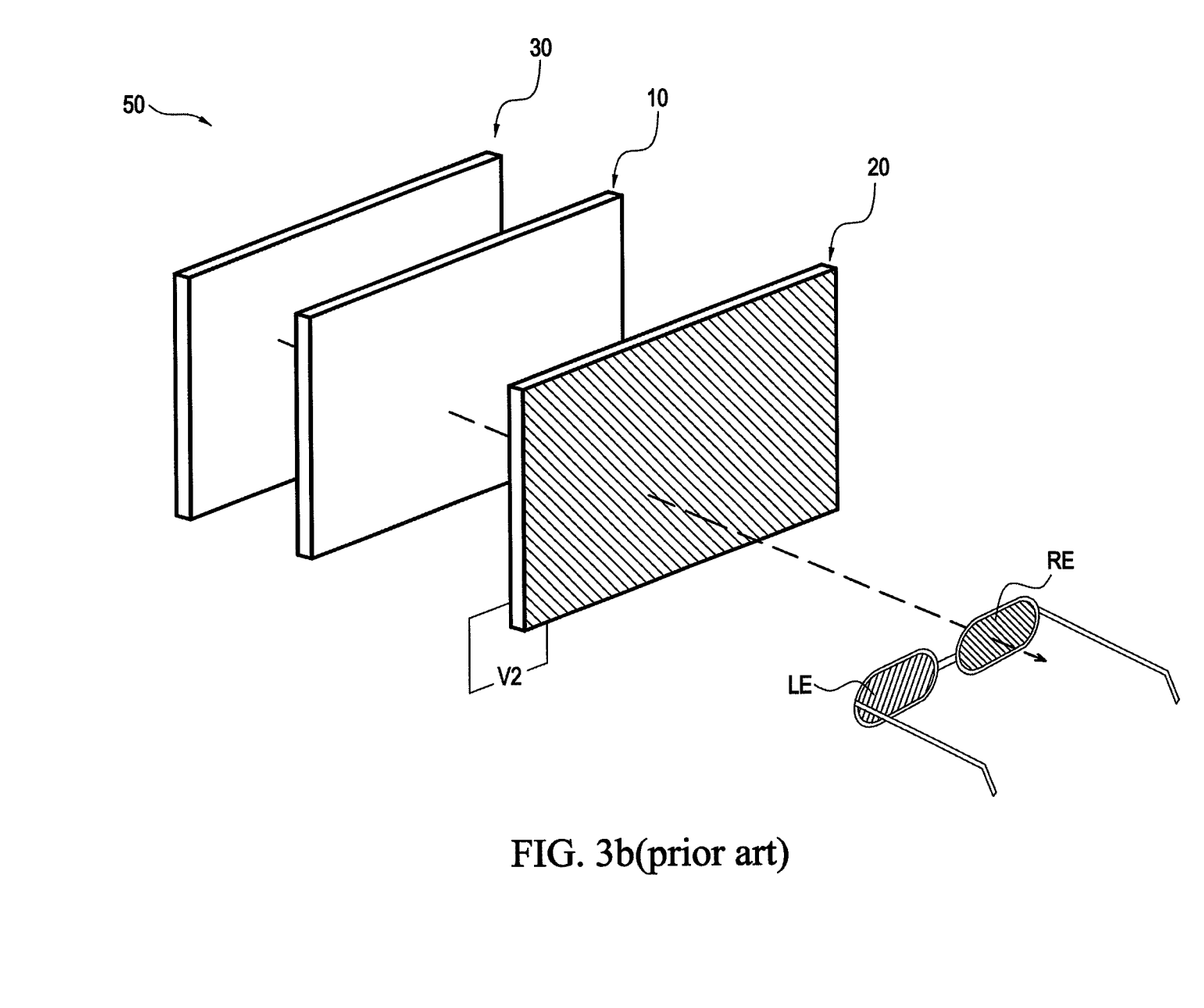

Referring to FIG. 3a and FIG. 3b, an operation principle of the second type of 3D displaying system 50 are described as follows. First, the left-eye data and right-eye data are sent to the first panel 10 of the 3D displaying system at the frame rate of 120 Hz in a sequence of the left-eye data, the right-eye data, the left-eye data . . . . Second, when the first panel 10 receives the left-eye data, the second panel 20 is driven by a voltage V1, whereby a light is outputted from the second panel 20 to have the polarization of 45 degrees, the light passes through the left-eye spectacle LE, and thus the left-eye data is sent to the left eye. When the first panel 10 receives the right-eye data, the second panel 20 is driven by a voltage V2, whereby a light is outputted the second panel 20 has the polarization of 135 degrees, the light passes through the right-eye spectacle RE, and thus the right-eye data is sent to the right eye.

However, due to a data scanning manner of the first panel 10, the second panel 20 can be driven only after all the display data is written in the first panel 10, and thus the brightness of an image picture received by human eyes is reduced. Further, the second panel 20 has a complete sheet of driving electrode, so the second panel 20 has a large load capacitance ($C_{Load}$), and thus an instantaneous current during starting is very large. In addition, the second type of 3D displaying system needs to additionally use an implementation circuit to generate an operating voltage. The implementation circuit adds 3 switches, 2 groups of voltage (0.3 V and 5.7 V), and two thin film transistors (TFTs), thereby increasing the cost of parts.

Therefore, it is required to provide method, device and system for displaying 3D stereo images capable of solving the forgoing problems.

SUMMARY OF THE DISCLOSURE

The present disclosure is directed to a 3D displaying system, which includes a 3D displaying device and a pair of polarized glasses. The 3D displaying device includes a first panel, a second panel and a backlight unit. The first panel includes a first liquid crystal layer for providing a left-eye image and a right-eye image. The second panel includes a first driving electrode substrate, a second driving electrode substrate and a second liquid crystal layer disposed between the first driving electrode substrate and the second driving electrode substrate, whereby light passing therethrough to generate polarization of a first angle or a second angle, wherein the second panel includes at least three sub-panel units. The backlight unit is disposed below the first panel and includes at least three light-emitting areas respectively corresponding to the at least three sub-panel units for providing a light source to the first panel and the second panel. The pair of polarized glasses includes two polarizers of the first angle and the second angle.

In the prior art, to increase the brightness of the backlight unit to the extent acceptable by the user, LEDs having higher driving current may be selected, which increases the cost, increases the power consumption, and causes reduction of lifetime of the LEDs. Further, compared with the prior art, according to the same brightness accepted by the human eyes, the present disclosure does not need to increase the brightness of the backlight unit, and thus the present disclosure has the advantages in terms of cost and energy-saving. In addition, the gamma voltages and the common voltage (Vcom) for driving the second panel may directly be from the gamma voltages and the Vcom designed for the first panel, and there is no need to use an addition circuit to generate the voltages as in the prior art, thereby having low circuit cost.

Compared with the prior art, percentages of energy-saving of the 3D displaying systems (the second panels thereof respectively include 3, 4, 8 and 12 sub-panel units) of the present disclosure are shown in the following table:

| Number of sub-panel units of the second panel | Number of light-emitting areas of the scanning type backlight unit | Energy saving rate for driving liquid crystal of the first panel | Light utilization rate of the scanning type backlight unit |
|---|---|---|---|
| 3 | 3 | 9.3% | 30.6% |
| 4 | 4 | 15% | 32% |
| 8 | 8 | 23.48% | 44.44% |
| 12 | 12 | 26.3% | 47.86% |

Higher number of the sub-panel units of the second panel and higher number of the light-emitting areas of the scanning type backlight unit will result in higher energy saving rate for driving the liquid crystal of the first panel and higher light utilization rate of the scanning type backlight unit.

In order to make the aforementioned and other objectives, features and advantages of the present disclosure comprehensible, embodiments are described in detail below with reference to the accompanying drawings.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE DISCLOSURE

Figure 4:
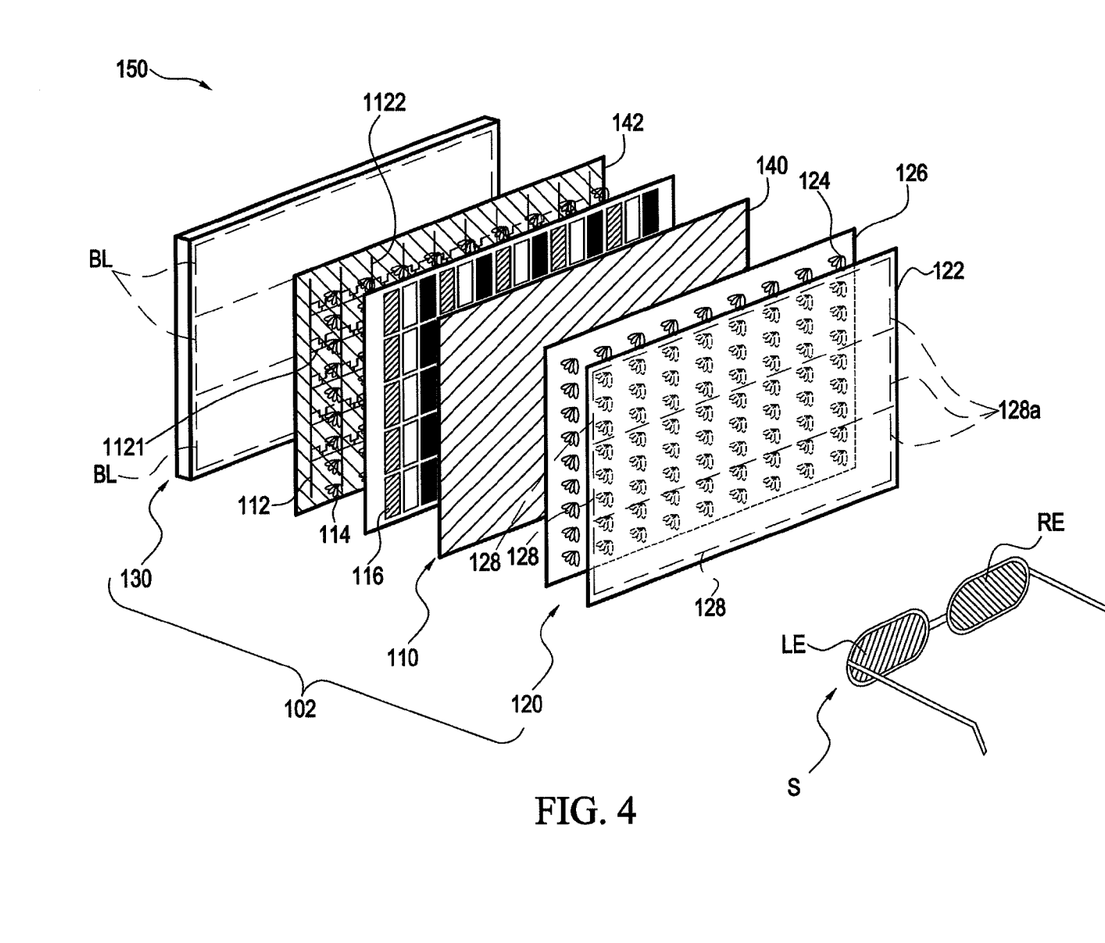
FIG. 4 is a schematic exploded perspective view of a 3D displaying system according to an embodiment of the present disclosure.

Referring to FIG. 4, it shows a 3D displaying system 150 according to an embodiment of the present disclosure, wherein the 3D displaying system 150 is a system for displaying three-dimensional stereo images. The 3D displaying system 150 includes a 3D displaying device 102 and a pair of polarized glasses S, wherein the 3D displaying device 102 is a device for displaying three-dimensional stereo images. The 3D displaying device 102 includes a first panel 110, a second panel 120, and a scanning type backlight unit 130. In the following illustration, "above" refers to a direction towards the polarized glasses S, and "below" refers to a direction away from the polarized glasses S.

The first panel 110 is used for providing a left-eye image and a right-eye image. The first panel 110 includes upper and lower polarizers 140, 142 disposed on an upper surface and a lower surface thereof, and includes a thin film transistor (TFT) array substrate 112, a first a liquid crystal (LC) layer 114, and a color filter substrate 116, where the first LC layer 114 is disposed between the TFT array substrate 112 and the color filter substrate 116. The TFT array substrate 112 includes a plurality of gate lines 1121 (for example, the number of gate lines is 1080) and a plurality of source lines 1122 (for example, the number of source lines is 1920). The gate lines 1121 extend horizontally and are arranged longitudinally in sequence. The source lines 1122 extend longitudinally and are arranged horizontally in sequence.

The second panel 120 is disposed above the first panel 110, and includes a first driving electrode substrate 122, a second LC layer 124, and a second driving electrode substrate 126. The second LC layer 124 is disposed between the first driving electrode substrate 122 and the second driving electrode substrate 126, whereby light which passes through the second LC layer 124 generates polarization of a first angle (for example, 135 degrees) or a second angle (for example, 45 degrees). The second panel 120 includes at least three sub-panel units 128, that is, the first driving electrode substrate 122 may include at least three sheets of first driving electrodes 128a, and the first driving electrodes 128a are electrically isolated from one another. The second driving electrode substrate 126 may also include at least three sheets of second driving electrodes 126a, and the second driving electrodes 126a are electrically isolated from one another and respectively corresponding to the first driving electrodes 128a.

The scanning type backlight unit 130 is disposed below the first panel 110, and includes at least three light-emitting areas BL respectively corresponding to the at least three sub-panel units 128 for providing a light source to the first panel 110 and the second panel 120.

In this embodiment, the second panel 120 includes eight sub-panel units 128, that is, the first driving electrode substrate 122 of the second panel 120 includes eight sheets of first driving electrodes 128a, the second driving electrode substrate 126 also includes eight sheets of second driving electrodes, and the scanning type backlight unit also includes eight light-emitting areas, which are illustrated in detail below.

Figure 5:
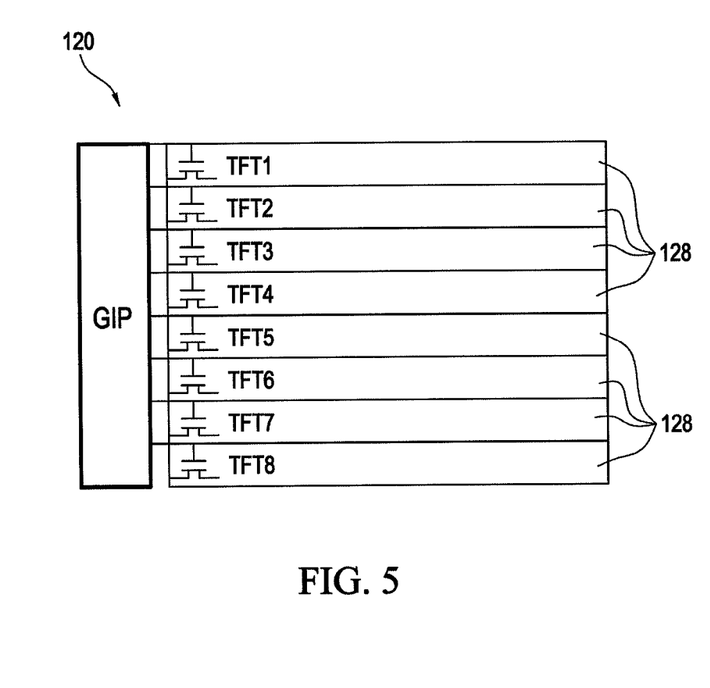
FIG. 5 is a schematic plane view of a second panel according to an embodiment of the present disclosure.

For example, the second panel 120 is averagely divided into eight parts longitudinally, which are designed into eight sub-panel units 128, and operations of the sub-panel units 128 are controlled respectively by eight TFTs TFT1~TFT8 (as shown in FIG. 5). A gate in panel (GIP) process is used to manufacture gate driver integrated circuits (ICs), so as to reduce the number of the used gate driven ICs and reduce the manufacture cost. There is only one source line at a source side, thereby saving the use of a source driver IC, and only controlling a written voltage by an external circuit (described below).

Each sub-panel unit 128 of the second panel 120 is driven in a time division manner, so a load capacitance ($C_{Load}$) of each sub-panel unit 128 is ⅛ of that in the prior art. Due to the property of the load capacitance of the second panel 120, an in rush current (Irush) may be reduced to ⅛ (as shown in Formula 1) when starting, and thus the selected specifications of components of an implementation circuit may be reduced.

$$I_{rush} = C_{LOAD} \times \frac{dV}{dt} \quad \text{(Formula 1)}$$

Figure 6:
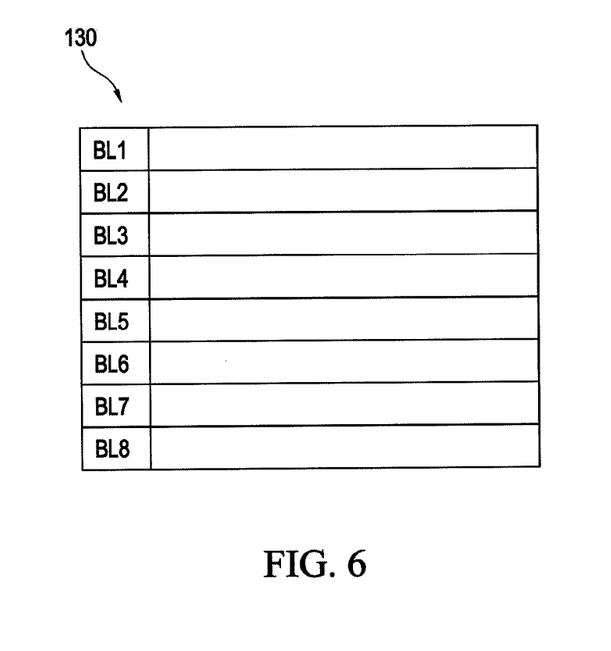
FIG. 6 is a schematic plane view of a scanning type backlight unit according to an embodiment of the present disclosure.

The scanning type backlight unit 130 is also divided into eight light-emitting areas BL1~BL8, as shown in FIG. 6. The range of each light-emitting area corresponds to each sub-panel unit 128 of the second panel 120, so as to ensure the quality of the 3D image picture. The scanning type backlight 130 may use a direct-light-type light emitting diode (LED) or a cold cathode fluorescent lamp (CCFL), and the design method thereof does not intend to limit the scope of the present disclosure.

Figure 7:
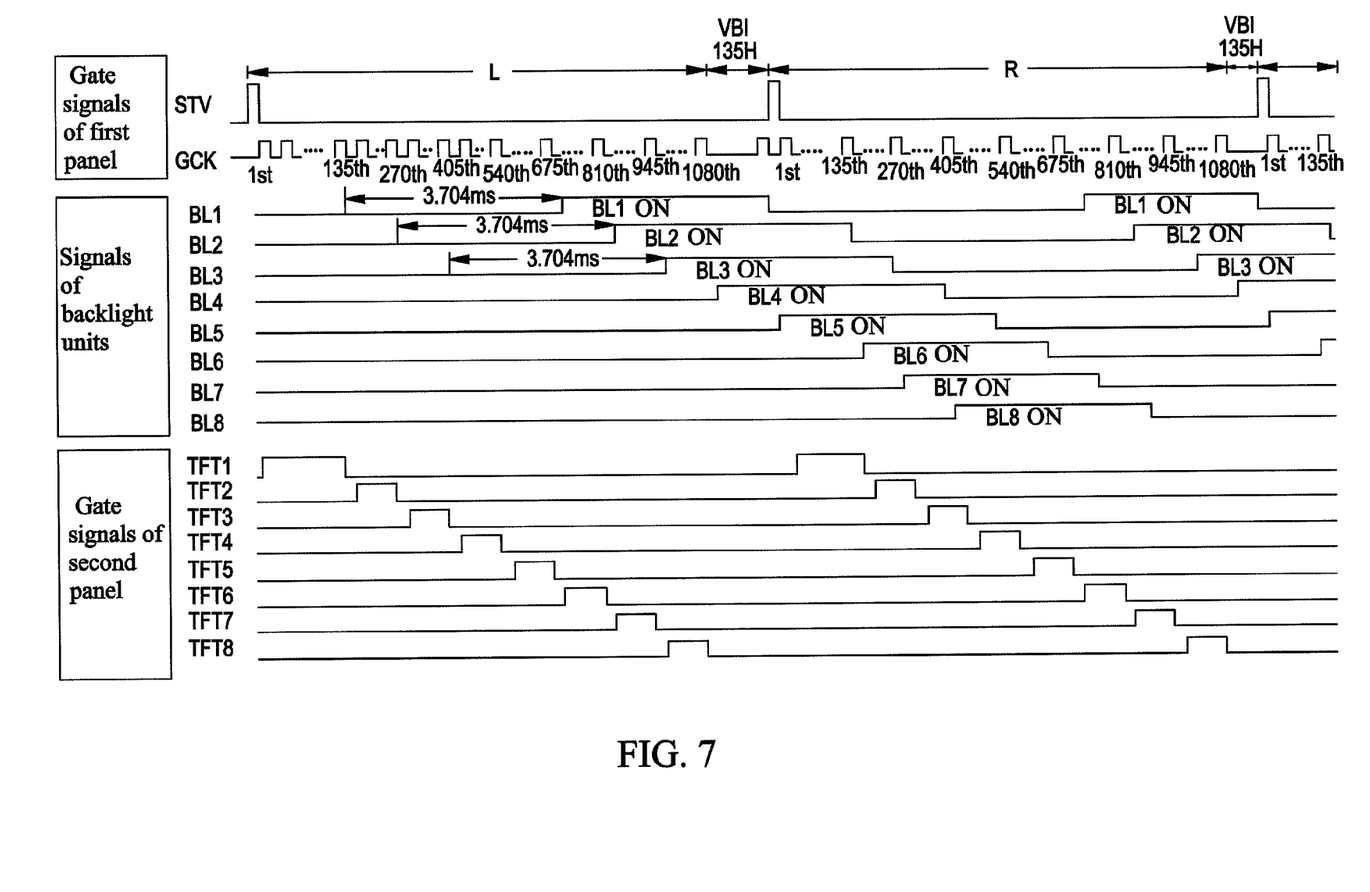
FIG. 7 shows a timing of various driving signals of a 3D displaying system according to an embodiment of the present disclosure.

Referring to FIG. 7, it shows a timing of various driving signals of a 3D displaying system 150 according to an embodiment of the present disclosure. The first panel 110 shows a common image picture, for providing a left-eye image and a right-eye image. Therefore, various control signals of the first panel 110 are outputted in a conventional timing. A gate clock signal (GCK) of the first panel 110 may control a scanning timing of the scanning type backlight unit 130 and gate output signals of the second panel 120.

For example, a full high definition (HD) panel is used to illustrate the timing in detail, and the so-called Full-HD (1920*1080) represents the definition of the panel, in which the number of horizontal pixels is 1920, the number of vertical pixels is 1080, and a golden ratio of vision being 16:9 is thus formed.

A display area of the first panel 110 totally has 1080 gate lines, the second panel 120 includes eight sub-panel units, and the scanning type backlight unit 130 includes eight light-emitting areas under control, so each sub-panel unit and each light-emitting area correspond to an area including 135 gate lines. The VBI can be set as 135 H (that is, a period of time for scanning 135 gate lines). When right-eye frame data R is input, and the GCK of the first panel 110 is outputted to $1^{st}$, $136^{th}$, $271^{st}$, $406^{th}$, $541^{st}$, $676^{th}$, $811^{st}$, and $946^{th}$ gate line, the gate output signal of the second panel 120 turns on the TFTs TFT1~TFT8 according to the sequence, that is, turns on the TFT1 during GCK1, turns on the TFT2 during GCK136, turns on the TFT3 during GCK271 . . . . The width of a high signal of the gate output signal of the second panel 120 must be wider than the width of a gate output signal of the first panel 110, so as to increase the time for charging liquid crystals.

Then, the ON/OFF timing of the light-emitting area BL1 of the scanning type backlight unit 130 is illustrated below: when the GCK675 (540+135=675) of the first panel 110 is changed from a high signal to a low signal, the light-emitting area BL1 is turned on. The light-emitting area BL1 corresponds to $1^{st}$ to $135^{th}$ gate lines, and the first LC layer 114 of the first panel 110 relative to the light-emitting area BL1 is charged for a period of time from GCK136 to the time when the light-emitting area BL1 is turned on, i.e., the time is 3.7 ms (as shown in Equation 1), which can be used as an LC response time.

$$\text{scanning time for each gate line} = \quad \text{(Equation 1)}$$

$$\frac{1}{120*(1080+135)} = 6.858\mu.$$

scanning time from GCK136 to the turn-on of the BL1=6.858μ×540=3.704 ms

That is to say, the period of scanning time from the GCK1 to the turn-on of the light-emitting area BL1 is 6.858μ× 675=4.63 ms.

When the light-emitting area BL1 is turned on, the relative areas of the first and second panels 110, 120 have been finished to a set state (for example, the second panel 120 can enable the light passing therethrough to generate polarization of 135 degrees), and human eyes view the left-eye frame data L in this area. The light-emitting area BL1 is turned off when a next gate driver vertical start signal (STV) is sent out, and right-eye frame data R start to be written to the first panel 110.

Accordingly, when the GCK675 (540+135=675) of the right-eye frame data R turns from a high signal to a low signal, the light-emitting area BL1 is turned on again, the second panel 120 can enable the light passing therethrough to generate polarization of 45 degrees, and human eyes view the right-eye frame data R in this area.

In brief, referring to FIG. 4 again, the pair of polarized glasses S includes a left-eye spectacle LE and a right-eye spectacle RE, in which the left-eye spectacle LE and the right-eye spectacle RE respectively have a polarizer of a first angle (for example, 135 degrees) and a polarizer of a second angle (for example, 45 degrees). Operation principles of the 3D displaying system 150 are described as follows. First, the left-eye data and right-eye data are sent to the first panel 110 of the 3D displaying system at the frame rate of 120 Hz in a sequence of the left-eye data, the right-eye data, the left-eye data . . . . Second, when the first panel 110 receives the left-eye data, the second panel 120 is driven, whereby the output light has the polarization of 45 degrees, the light passes through the left-eye spectacle LE, and thus the left-eye data is sent to the left eye. When the first panel 110 receives the right-eye data, the second panel 120 is driven, whereby the output light has the polarization of 135 degrees, the light passes through the right-eye spectacle RE, and thus the right-eye data is sent to the right eye.

Operations of the light-emitting areas BL2~BL8 and the corresponding TFTs TFT2~TFT8 of the sub-panel units 128 of the second panel 120 can be deduced through analog according to the operations of the light-emitting area BL1 and the corresponding TFT TFT1 of the sub-panel unit 128 of the second panel 120. For example, ON/OFF signals of the light-emitting areas BL2~BL8 of the scanning type backlight unit 130 and gate output signals of the TFTs TFT2~TFT8 of the sub-panel units 128 of second panel 120 are delayed by 135 H, 270 H, 405 H, 540 H, 675 H, 810 H and 945 H respectively.

In other words, a 3D displaying method (i.e. a method for displaying three-dimensional stereo images) provided in the present disclosure includes the following steps. A 3D displaying device 102 is provided, which includes a first panel 110, a second panel 120, and a backlight unit 130, wherein the first panel 110 includes N*M gate lines (i.e. the number of gate lines is N*M), the second panel 120 includes N sub-panel units, and the backlight unit 130 includes N light-emitting areas, N and M are positive integers greater than 2 (for example, the number of gate lines in this embodiment is 1080 which equals to 8 areas multiplied by 135 gate lines in each area, and thus N equals to 8, and M equals to 135). When a 1st gate driver STV is sent out, a 1st GCK is output for the first time. When the first panel 110 outputs a $[1+(n-1)*M]^{th}$ GCK in sequence, the corresponding gate output signal of the second panel 120 turns on the $n^{th}$ TFT of the sub-panel unit in sequence, where n is a positive integer from 1 to N in sequence. When the $[N*M/2+n*M]^{th}$ GCK is changed from a high signal to a low signal, the $n^{th}$ light-emitting area of the backlight unit 130 is turned on, wherein the width of the high signal of the gate output signal of the second panel 120 must be wider than the width of the gate output signal of the first panel 110. When the $n^{th}$ light-emitting area of the backlight unit 130 is turned on, the relative area of the first and second panels 110, 120 has been finished to the set state, and the second panel 120 enables the light passing therethrough to generate the polarization of the first angle. After a period of scanning time for [(n−1)*M] gate lines after the $2^{nd}$ STV is sent out, the $n^{th}$ light-emitting area of the backlight unit 130 is turned off in sequence.

The 3D displaying method of the present disclosure further includes the following steps. When the $2^{nd}$ STV is sent out, the $1^{st}$ GCK is output for the second time. When the first panel 110 outputs the $[1+(n-1)*M]^{th}$ GCK in sequence, the corresponding gate output signal of the second panel 120 turns on the TFT of the $n^{th}$ sub-panel unit in sequence, wherein n is a positive integer from 1 to N in sequence. When the $[N*M/2+n*M]^{th}$ GCK is changed from a high signal to a low signal, the $n^{th}$ light-emitting area of the backlight unit 130 is turned on, wherein the width of the high signal of the gate output signal of the second panel 120 must be wider than the width of the gate output signal of the first panel 110. When the $n^{th}$ light-emitting area of the backlight unit 130 is turned on, the relative area of the first and second panels 110, 120 has be finished to the set state, and the second panel 120 enables the light passing therethrough to generate the polarization of the second angle. After a period of scanning time for [(n−1)*M] gate lines after a $3^{rd}$ STV is sent out, the $n^{th}$ light-emitting area of the backlight unit 130 is turned off in sequence.

It can be seen from Equation 2 that in each frame period, a ratio of brightness that can be received by human eyes provided in the present disclosure is 4/9 (that is, the light utilization rate of the scanning type backlight unit 130), which is increased by 11.1% as compared with ⅓ in the prior art.

$$V_{total} = 1080 + 135 = 1215 \quad \text{(Equation 2)}$$

$$BL\_turnon = \frac{(1215 - 675)}{1215} = \frac{4}{9} = 44.44\%$$

Further, a frequency of the GCK in the prior art is 190.56 KHz (120*1588=190.56 K), and in the present disclosure, a frequency of the GCK is 145.8 KHz (120*1215=145.8 K). It can be seen from formula 2 that using the liquid crystal driving of the first panel 110 of the present disclosure is rather energy-saving. Compared with the prior art, the liquid crystal driving of the first panel 110 of the present disclosure may save the electricity by 23.48% (1−(145.8/190.56)=23.48%).

$$P=\frac{1}{2} \times CV^2 f \quad \text{(Formula 2)}$$

In the prior art, to increase the brightness of the backlight unit to the extent acceptable by the user, LEDs having higher driving current may be selected, which increases the cost, increases the power consumption, and causes reduction of lifetime of the LEDs. Compared with the prior art, according to the same brightness accepted by the human eyes, the present disclosure does not need to increase the brightness of the backlight unit, and thus the present disclosure has the advantages in terms of cost and energy-saving.

Figure 8:
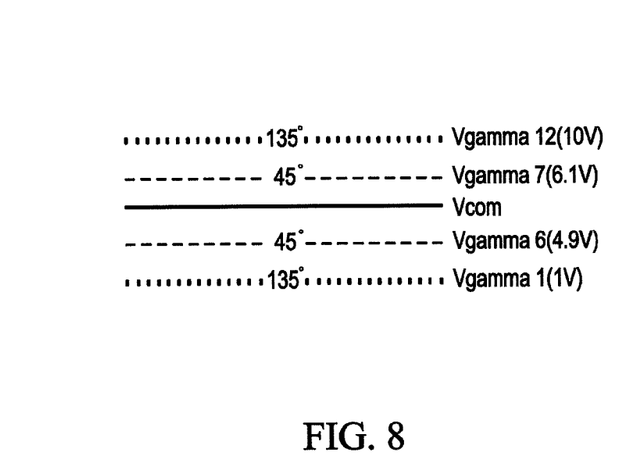
FIG. 8 shows that driving voltages of the second panel of the present disclosure may use gamma voltages (Vgamma 1, 6, 7, 12) and a Vcom of the first panel.

In the first panel 110, a relationship of the applied voltage between the TFT array substrate and the color filter substrate and light transmittance of liquid crystal molecules is not linear. When operating the first panel 110, the applied voltage between the TFT array substrate and the color filter substrate is changed so as to change the light transmittance of the liquid crystal molecules and then to display image pictures. The applied voltage between TFT array substrate and the color filter substrate is referred to as a gamma voltage. The driving voltages of the second panel 120 of the present disclosure may use gamma voltages (Vgamma 1, 6, 7, 12) and a Vcom of the first panel 110, as shown in FIG. 8. The gamma voltages (Vgamma 1, 6, 7, 12) respectively correspond to four types of output voltages (6.1V, 1V, 4.9V and 10V) of a voltage selecting circuit, whereby there are four kinds of angles between an LC optical axis and an LC orientation axis of the second panel 120 respectively, where the four kinds of angles are respectively 135 degrees, 45 degrees, 135 degrees and 45 degrees.

Figure 9:
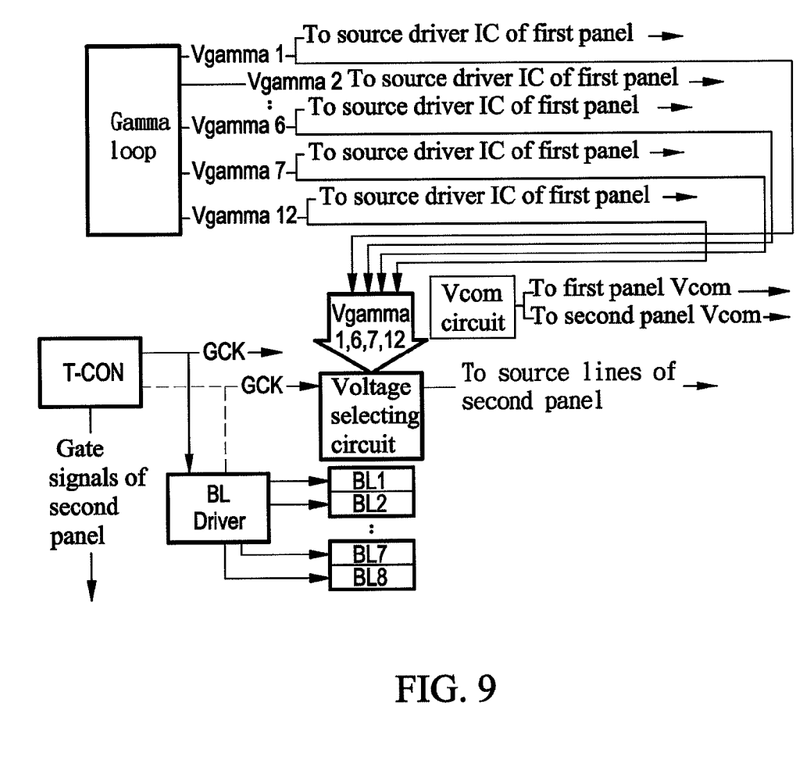
FIG. 9 is a driving block diagram of a 3D displaying system according to an embodiment of the present disclosure.

Referring to FIG. 9, a driving block diagram of the whole 3D displaying system 150 is shown. A gamma loop provides the gamma voltages to a source driving IC of the first panel 110. In addition, the gamma loop further provides the gamma voltages (Vgamma 1, 6, 7, 12) to a voltage selecting circuit of the second panel 120. A common voltage circuit (Vcom circuit) provides the Vcom to the first panel 110 and the second panel 120. The gamma voltages and the Vcom for driving the second panel 120 may directly be from the gamma voltages and the Vcom designed for the first panel 110, and there is no need to use an addition circuit to generate the voltages as in the prior art, thereby having low circuit cost.

Figure 10:
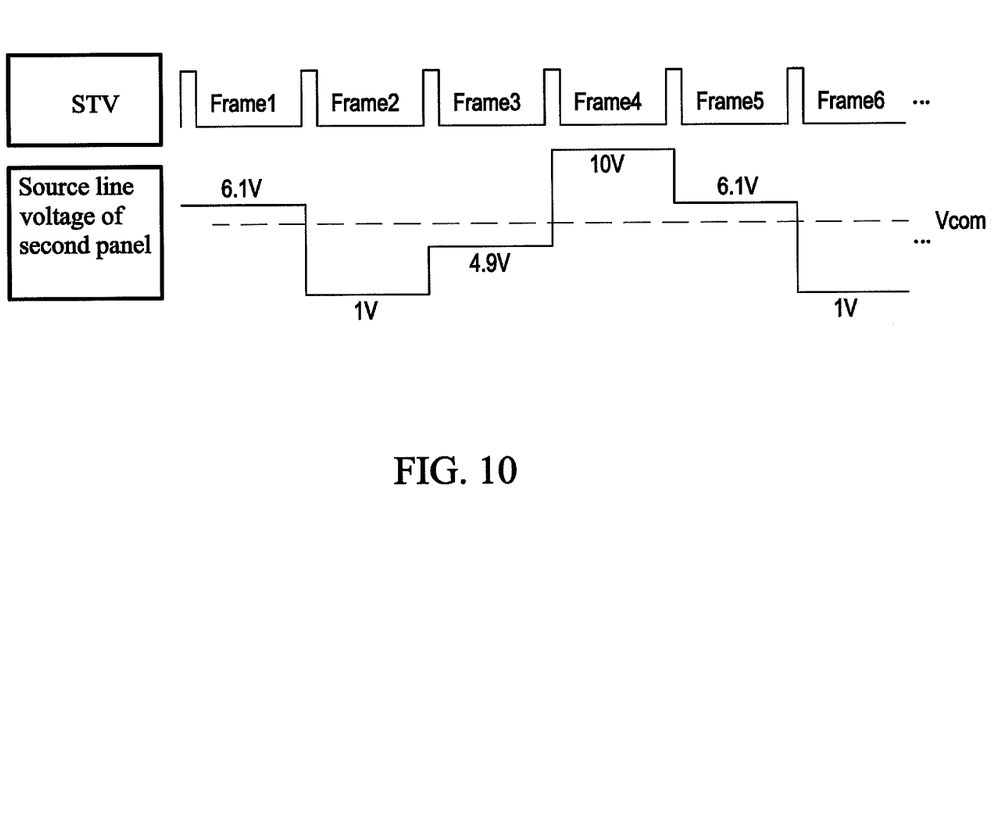
FIG. 10 shows that a voltage selecting circuit of the second panel of the present disclosure counts frames (Frame 1, 2, 3 . . . ) of a STV, so as to sequentially output four kinds of voltages (6.1 V, 1 V, 4.9 V and 10 V) to serve as voltages of source lines of the second panel.

A timing controller (T-CON) of the first panel 110 only needs to additionally generate gate output signals of the second panel 120, and send the gate output signals to a GIP circuit of the second panel 120. The voltage selecting circuit counts frames (Frame 1, 2, 3 . . . ) of the STV, so as to sequentially output four kinds of voltages (6.1 V, 1 V, 4.9 V and 10 V) to serve as voltages of sources line of the second panel, as shown in FIG. 10.

Referring to FIG. 9 again, the driving of the scanning type backlight unit 130 is implemented by a backlight driver (BL Driver) calculating the GCK to control ON/OFF of each of the light-emitting areas BL1~BL8. Therefore, compared with the prior art, the present disclosure can complete the 3D displaying system only by adding the voltage selecting circuit.

The number of the sub-panel units of the second panel and the number of the light-emitting areas of the scanning type backlight unit must be factors of the number of the plurality of gate lines of the first panel, and thus the second panel may also be designed to have 3, 4 and 12 sub-panel units (that is, the first driving electrode substrate includes 3, 4 and 12 sheets of first driving electrodes, the second driving electrode substrate also includes 3, 4 and 12 sheets of second driving electrodes) and the scanning type backlight unit includes 3, 4 and 12 light-emitting areas in other embodiments. The driving manner and operation of the whole 3D displaying system (the second panel thereof includes 3, 4 and 12 sub-panel units) may be deduced through analog according to the driving manner and operation of the 3D displaying system (the second panel thereof includes 8 sub-panel units), which are not repeated here.

Compared with the prior art, percentages of energy-saving of the 3D displaying systems (the second panels thereof respectively include 3, 4, 8 and 12 sub-panel units) of the present disclosure are shown in the following table:

| Number of sub-panel units of the second panel | Number of light-emitting areas of the scanning type backlight unit | Energy saving rate for driving liquid crystal of the first panel | Light utilization rate of the scanning type backlight unit |
| --- | --- | --- | --- |
| 3 | 3 | 9.3% | 30.6% |
| 4 | 4 | 15% | 32% |
| 8 | 8 | 23.48% | 44.44% |
| 12 | 12 | 26.3% | 47.86% |

Higher number of the sub-panel units of the second panel and higher number of the light-emitting areas of the scanning type backlight unit will result in higher energy saving rate for driving the liquid crystal of the first panel and higher light utilization rate of the scanning type backlight unit.

The disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. A device for displaying three-dimensional stereo images, the device comprising:
    a first panel comprising a first liquid crystal layer for providing a left-eye image and a right-eye image;
    a second panel comprising a first driving electrode substrate, a second driving electrode substrate, a second liquid crystal layer disposed between the first driving electrode substrate and the second driving electrode substrate, whereby light passing therethrough to generate a polarization of a first angle or a second angle, wherein the second panel comprises at least three sub-panel units; and
    a backlight unit disposed below the first panel and comprising at least three light-emitting areas respectively corresponding to the three sub-panel units for providing a light source to the first panel and the second panel;
    wherein driving voltages of the second panel use four gamma voltages and a common voltage of the first panel; and
    the four gamma voltages respectively correspond to four kinds of output voltages of a voltage selecting circuit at the second panel, whereby there are four kinds of angles between a liquid crystal optical axis and a liquid crystal orientation axis of the second panel respectively, and the four kinds of angles are respectively the first angle, the second angle, the first angle and the second angle.

2. The device according to claim 1, wherein one of the first driving electrode substrate and the second driving electrode substrate comprises at least three sheets of first driving electrodes, and the first driving electrodes are electrically isolated from one another.

3. The device according to claim 2, wherein the other one of the first driving electrode substrate and the second driving electrode substrate also comprises at least three sheets of second driving electrodes respectively corresponding to the first driving electrodes.

4. The device according to claim 1, wherein:
    the first panel comprises a thin film transistor array substrate, the thin film transistor array substrate comprises N*M gate lines, N and M are positive integers greater than 2, and the gate lines extend horizontally and are arranged longitudinally in sequence; and
    the second panel comprises at least N sub-panel units, the backlight unit comprises N light-emitting areas, and each sub-panel unit and each light-emitting area correspond to an area comprising M gate lines, wherein a vertical blanking interval is set as a period of time for scanning M gate lines.

5. The device according to claim 1, wherein the voltage selecting circuit counts frames of a gate driver start signal of a timing controller of the first panel, so as to sequentially output the four kinds of output voltages to serve as voltages of source lines of the second panel.

6. A system for displaying three-dimensional stereo images, the system comprising:
    a device for displaying three-dimensional stereo images, the device comprising:
        a first panel comprising a first liquid crystal layer for providing a left-eye image and a right-eye image;
        a second panel comprising a first driving electrode substrate, a second driving electrode substrate and a second liquid crystal layer disposed between the first driving electrode substrate and the second driving electrode substrate, whereby light passing therethrough to generate a polarization of a first angle or a second angle, wherein the second panel comprises at least three sub-panel units; and
        a backlight unit disposed below the first panel and comprising at least three light-emitting areas respectively corresponding to the three sub-panel units for providing a light source to the first panel and the second panel;
        wherein driving voltages of the second panel use four gamma voltages and a common voltage of the first panel; and
        the four gamma voltages respectively correspond to four kinds of output voltages of a voltage selecting circuit of the second panel, whereby there are four kinds of angles between a liquid crystal optical axis and a liquid crystal orientation axis of the second panel respectively, and the four kinds of angles are respectively the first angle, the second angle, the first angle and the second angle; and
    a pair of polarized glasses comprising two polarizers having the first angle and second angle.

7. The system according to claim 6, wherein one of the first driving electrode substrate and the second driving electrode substrate comprises at least three sheets of first driving electrodes, and the first driving electrodes are electrically isolated from one another.

8. The system according to claim 7, wherein the other one of the first driving electrode substrate and the second driving electrode substrate also comprises at least three sheets of second driving electrodes respectively corresponding to the first driving electrodes.

9. The system according to claim 6, wherein:
    the first panel comprises a thin film transistor array substrate, the thin film transistor array substrate comprises N*M gate lines, N and M are positive integers greater than 2, and the gate lines extend horizontally and are arranged longitudinally in sequence; and
    the second panel comprises at least N sub-panel units, the backlight unit comprises N light-emitting areas, and each sub-panel unit and each light-emitting area correspond to an area comprising M gate lines, wherein a vertical blanking interval is set as a period of time for scanning M gate lines.

10. The device according to claim 6, wherein the voltage selecting circuit counts frames of a gate driver start signal of a timing controller of the first panel, so as to sequentially output the four kinds of output voltages to serve as voltages of source lines of the second panel.

11. A method for displaying three-dimensional stereo images, the method comprising:
  providing a three-dimensional (3D) displaying device, wherein the 3D displaying device comprises a first panel, a second panel and a backlight unit, the first panel comprises N*M gate lines, the second panel comprises N sub-panel units, the backlight unit comprises N light-emitting areas, N and M are positive integers greater than 2;
  when a $1^{st}$ gate driver start signal (STV) is sent out, outputting a $1^{st}$ gate clock signal (GCK) for a first time;
  when the first panel outputs a $[1+(n-1)*M]^{th}$ GCK in sequence, turning on a thin film transistor (TFT) of an $n^{th}$ sub-panel unit in sequence by a corresponding gate output signal of the second panel, wherein n is a positive integer from 1 to N in sequence;
  when a $[N*M/2+n*M]^{th}$ GCK turns from a high signal to a low signal, turning on an $n^{th}$ light-emitting area of the backlight unit, wherein a width of the high signal of the gate output signal of the second panel must be wider than a width of a gate output signal of the first panel;
  when the $n^{th}$ light-emitting area of the backlight unit is turned on, finishing a relative area of the first and the second panel to a set state, whereby the second panel enables light passing therethrough to generate polarization of a first angle; and
  after a period of time for scanning $[(n-1)*M]$ gate lines after a $2^{nd}$ gate driver STV is sent out, sequentially turning off the $n^{th}$ light-emitting area of the backlight unit.

12. The method according to claim 11, further comprising:
  when the $2^{nd}$ gate driver STV is sent out, outputting the $1^{st}$ GCK for a second time;
  when the first panel outputs the $[1+(n-1)*M]^{th}$ GCK in sequence, turning on the TFT of the $n^{th}$ sub-panel unit in sequence by the corresponding gate output signal of the second panel, wherein n is a positive integer from 1 to N according to the sequence;
  when the $[N*M/2+n*M]^{th}$ GCK turns from the high signal to the low signal, turning on the $n^{th}$ light-emitting area of the backlight unit, wherein the width of the high signal of the gate output signal of the second panel must be wider than the width of the gate output signal of the first panel;
  when the $n^{th}$ light-emitting area of the backlight unit is turned on, finishing the relative area of the first and the second panel to a set state, whereby the second panel enables light passing therethrough to generate polarization of a second angle; and
  after a period of time for scanning $[(n-1)*M]$ gate lines after a $3^{rd}$ gate driver STV is sent out, turning off the $n^{th}$ light-emitting area of the backlight unit in sequence.

* * * * *